United States Patent

Matsubayashi et al.

[19]

[11] Patent Number: 5,909,216
[45] Date of Patent: Jun. 1, 1999

[54] DATA PROCESSING APPARATUS FOR IMAGE AND RELATED DATA DISPLAY

[75] Inventors: Kazuhiro Matsubayashi, Yokohama; Tsunekazu Arai, Tama, both of Japan

[73] Assignee: Canon Kabushiki Kaisha, Tokyo, Japan

[21] Appl. No.: 08/452,864

[22] Filed: May 30, 1995

Related U.S. Application Data

[63] Continuation of application No. 07/996,888, Dec. 23, 1992, abandoned, which is a continuation of application No. 07/478,496, Feb. 12, 1990, abandoned.

[30] Foreign Application Priority Data

Feb. 15, 1989 [JP] Japan ................................ 1-033797

[51] Int. Cl.⁶ .................................................. G06T 11/00
[52] U.S. Cl. ...................... 345/347; 345/352; 340/995
[58] Field of Search .................... 395/155–161, 395/347; 364/444, 449; 340/990, 995; 345/347, 146, 352

[56] References Cited

U.S. PATENT DOCUMENTS

| | | | |
|---|---|---|---|
| 3,292,489 | 12/1966 | Johnson et al. | |
| 4,312,577 | 1/1982 | Fitzgerald | 364/444 X |
| 4,681,460 | 7/1987 | Nishimura | 368/21 |
| 4,737,916 | 4/1988 | Ogawa et al. | 364/449 X |
| 4,737,927 | 4/1988 | Hanabusa et al. | 364/449 X |
| 4,763,356 | 8/1988 | Day, Jr. et al. | 364/900 X |
| 4,789,962 | 12/1988 | Berry et al. | 395/347 X |
| 4,812,980 | 3/1989 | Yamada et al. | 364/449 |
| 4,890,104 | 12/1989 | Takanabe et al. | 364/424.01 X |
| 4,951,212 | 8/1990 | Kurihara et al. | 364/449 |
| 4,972,316 | 11/1990 | Delorme | 364/419 |
| 5,008,854 | 4/1991 | Maeda et al. | 364/709.04 X |

FOREIGN PATENT DOCUMENTS

| | | | |
|---|---|---|---|
| 0243140 | 10/1987 | European Pat. Off. | G04G 9/00 |
| 0271280 | 6/1988 | European Pat. Off. | G06F 3/033 |
| 2017980 | 10/1979 | United Kingdom . | |
| 2181627 | 4/1987 | United Kingdom | H04N 1/21 |

OTHER PUBLICATIONS

Macintosh Utilities User's Guide, pp. 123–131, 1988.

*Primary Examiner*—Mark K. Zimmerman
*Attorney, Agent, or Firm*—Fitzpatrick, Cella, Harper & Scinto

[57] ABSTRACT

A data processing apparatus includes a memory for storing image data and data corresponding to a display area of the image data, a display for displaying the image data stored in the memory, an input device for designating a position of the image data displayed by the display, a discriminator for discriminating a display area to which the position designated by the input device belongs, and a controller for reading out data corresponding to the display area discriminated by the discriminator and displaying the readout data on the display.

17 Claims, 6 Drawing Sheets

DATA PROCESSING APPARATUS FOR IMAGE AND RELATED DATA DISPLAY

This application is a continuation of application Ser. No. 07/996,888 filed Dec. 23, 1992, now abandoned, which is a continuation of application Ser. No. 07/478,496 filed Feb. 12, 1990, abandoned.

BACKGROUND OF THE INVENTION

1. Field of the Invention

The present invention relates to a data processing apparatus and, more particularly, to an input/output integrated type data processing apparatus for performing display control on the basis of, e.g., a coordinate input.

2. Related Background Art

In an apparatus of this type, for example, a map is displayed, and data such as a time in a designated city is displayed thereon. In another apparatus, a name list of all the cities to be processed is displayed, and when a target city is designated on the list, data of the designated city is displayed.

However, in the former conventional apparatus, when the number of cities is large, an area corresponding to one city becomes small, and it is difficult to correctly designate a target city.

In the latter conventional apparatus, when the number of cities is large, many city names must be displayed on one frame, or city names must be separately displayed on many frames. Therefore, a cumbersome operation is required until a target city is found.

SUMMARY OF THE INVENTION

It is an object of the present invention to a provide a data processing apparatus, with which when desired one of data displayed on a display apparatus is designated, data associated with the designated data can be quickly and accurately displayed.

It is another object of the present invention to provide data processing apparatus, with which when a desired area of data displayed on a display apparatus is designated, data included in the designated display area can be quickly and accurately displayed.

It is still another object of the present invention to provide a data processing apparatus which causes a display apparatus to display a world map, and, when a desired position on the world map is designated, can quickly and accurately display place name data, e.g., a name of a city near the designated position.

BRIEF DESCRIPTION OF THE DRAWINGS

FIG. 3 shows an example of a data storage format of a display buffer 7a;

DETAILED DESCRIPTION OF THE EMBODIMENTS

Preferred embodiments of the present invention will be described in detail hereinafter with reference to the accompanying drawings. Note that the present invention exemplifies an input/output integrated type data processing apparatus.

First Embodiment

The first embodiment will be described below.

Figure 1:
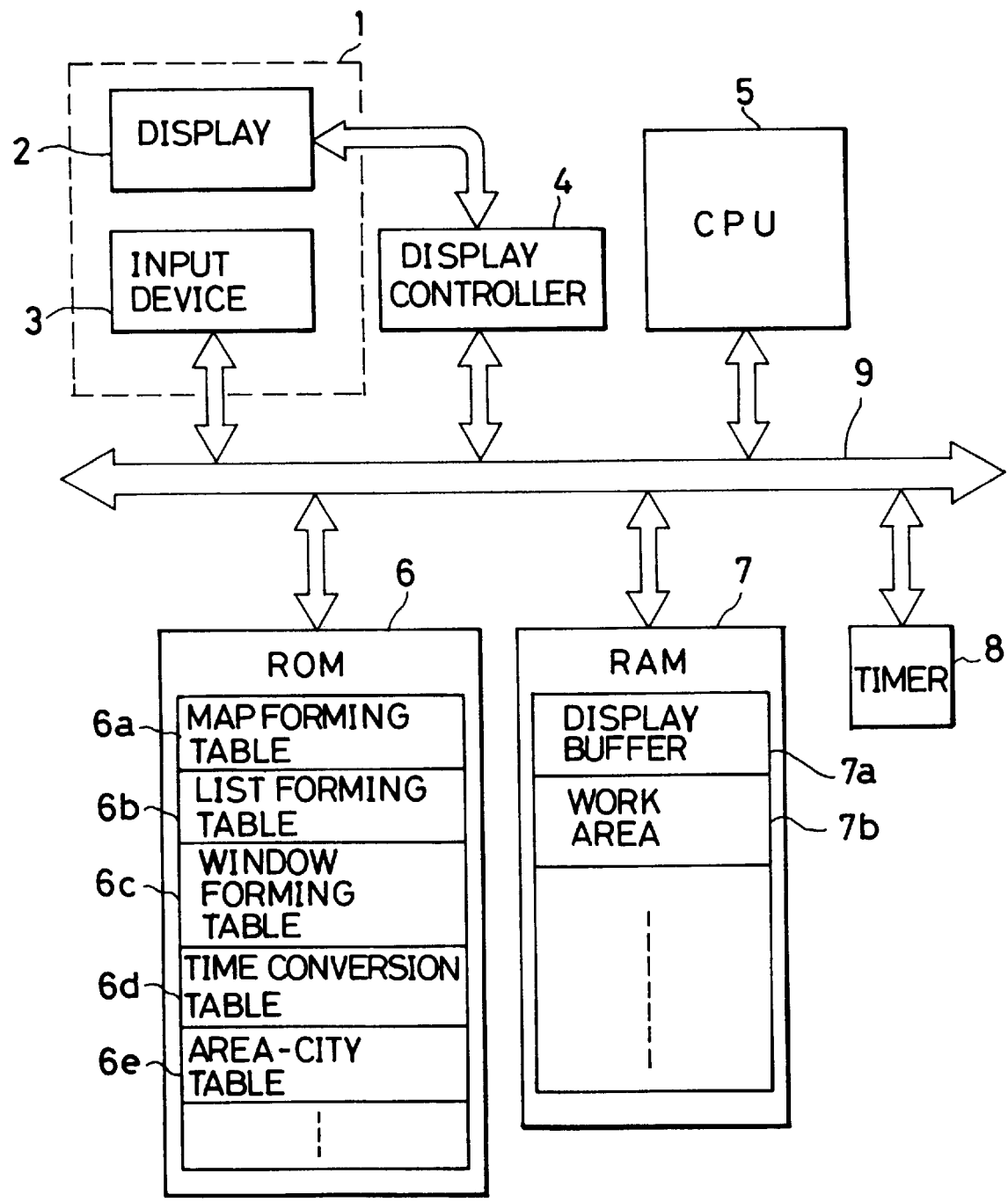
FIG. 1 is a block diagram showing an arrangement of a data processing apparatus according to the first embodiment of the present invention.

FIG. 1 is a block diagram showing an arrangement of a data processing apparatus according to the first embodiment of the present invention. In FIG. 1, an operation unit 1 performs a coordinate input and an output display by integrating a coordinate input device 3 and a display 2. The display 2 displays a map, a window for displaying a time in a city, and a list of city names near a designated city, as will be described later. The coordinate input device, i.e., the input device 3 detects a position depressed by a finger or a pen as coordinates by horizontal and vertical transparent electrodes on the display 2. Although not shown, the operation unit 1 comprises a window moving key for selecting a mode of moving a window on the display screen of the display 2. A display controller 4 performs display control of the display 2.

A CPU 5 controls the entire apparatus on the basis of various programs stored in a ROM 6. The ROM 6 stores a control program, an error processing program, a program for operating the CPU 5 in accordance with the flow chart of FIG. 3, display data of the display 2, and the like. A RAM 7 serves as work areas for various programs in the ROM 6, a temporary saving area in error processing, and the like. The ROM 6 stores the following tables as display data. A map forming table 6a stores data for displaying a world map on the entire display screen of the display 2. A list forming table 6b stores data for displaying a list of city names on the entire display screen of the display 2. In the list forming table 6b, each city name is stored in correspondence with a plurality of city names adjacent thereto. The list forming table 6b is used when coordinates in the window on the display screen of the display 2 are designated by a user. Upon designation by the user, a city name displayed on the window is searched from the list forming table 6b, and a plurality of city names corresponding to the city name are displayed on the entire display screen of the display 2. The list is displayed to include the city name in the window. A window forming table 6c is used to display a city name and local time (month, day, day of the week, and time) designated in a partial area on the display screen when a certain city on the world map displayed by the map forming table 6a is designated. A time conversion table 6d stores local time conversion data in units of cities in correspondence with areas. An area-city table 6e stores area numbers and corresponding city names in correspondence with a list display mode and a map display mode (including a window). The RAM 7 includes a display buffer 7a for, when a user makes a designation on the display screen, storing position data of a window for determining the designated area, area identification data indicating a list display or a map display, data indicating a window moving mode, and the like, and a work area 7b for various programs stored in the ROM 6. The area identification data can be set to be determined by a flag.

A timer 8 measures time using, e.g., Greenwich time as the reference time. A bus line 9 is used for transferring address signals, data, control signals, and the like in the apparatus.

A processing system of the first embodiment will be described below.

Figure 2:
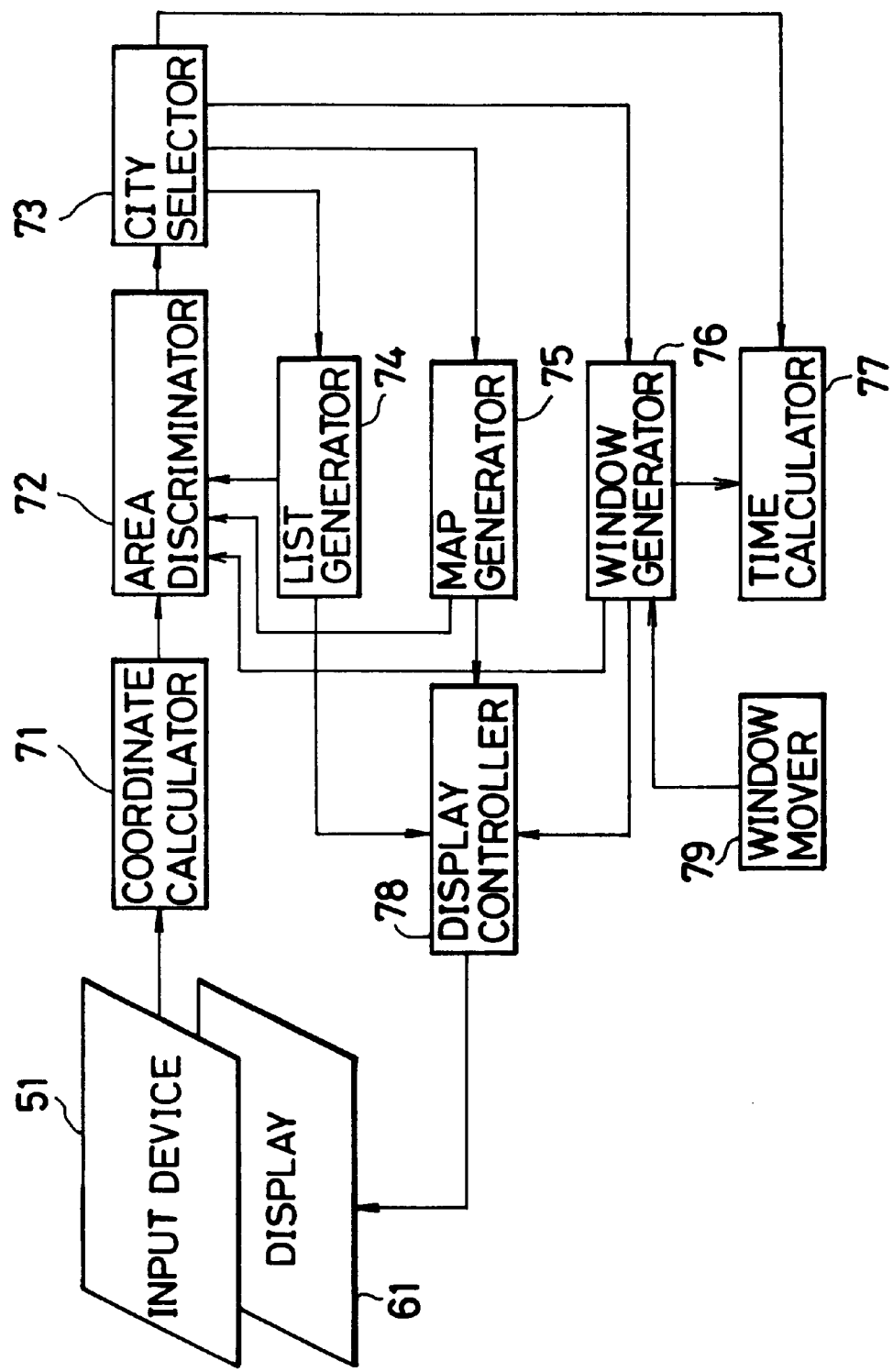
FIG. 2 is a block diagram for explaining a processing system of the first embodiment.

FIG. 2 is a block diagram for explaining the processing system of the first embodiment. In FIG. 2, a coordinate input device 51 corresponds to the input device 3, and a display 61 corresponds to the display 2. A coordinate calculator 71 receives a signal corresponding to an input position from the coordinate input device 51 and calculates X- and Y-coordinate values. An area discriminator 72 discriminates an area on the basis of the content of the display buffer 7a in accordance with whether an area indicated by coordinate values from the coordinate calculator 71 corresponds to area designation in the list, area designation in a map, or designation of a window area. A city selector 73 determines a city corresponding to the area discriminated by the area discriminator 72 on the basis of the area-city table 6e.

When the current display mode is a list display mode, a list generator 74 supplies area division data in the list forming table 6b to the area discriminator 72, and outputs list forming data to a display controller 78 (to be described later) on the basis of an instruction from the city selector 73. When the current display mode is a world map display mode, a map generator 75 supplies area division data in the map forming table 6a to the area discriminator 72, and outputs map forming data to the display controller 78 on the basis of an instruction from the city selector 73. When the current display mode is the world map display mode, a window generator 76 supplies position and size data of a window to the area discriminator 72, and outputs window forming data to the display controller 78 on the basis of an instruction from the city selector 73.

A time calculator 77 calculates a time in a city determined by the city selector 73 on the basis of time data of the timer 8 with reference to the time conversion table 6d, and outputs the calculation result to the window generator 76. The display controller 78 corresponds to the display controller 4, and performs display control of the display 61 on the basis of display data from the list generator 74, the map generator 75, and the window generator 76. A window mover 79 selects the window moving mode in response to the window moving key on the operation unit 1. Data from the window mover 79 is supplied to the window generator 76 and the area discriminator 72, and a window is moved to a coordinate position detected in the window display mode. The list generator 74, the map generator 75, the window generator 76, the time calculator 77, and the window mover 79 are used as screen updating means.

A method of storing display data will be described below.

Figure 3:
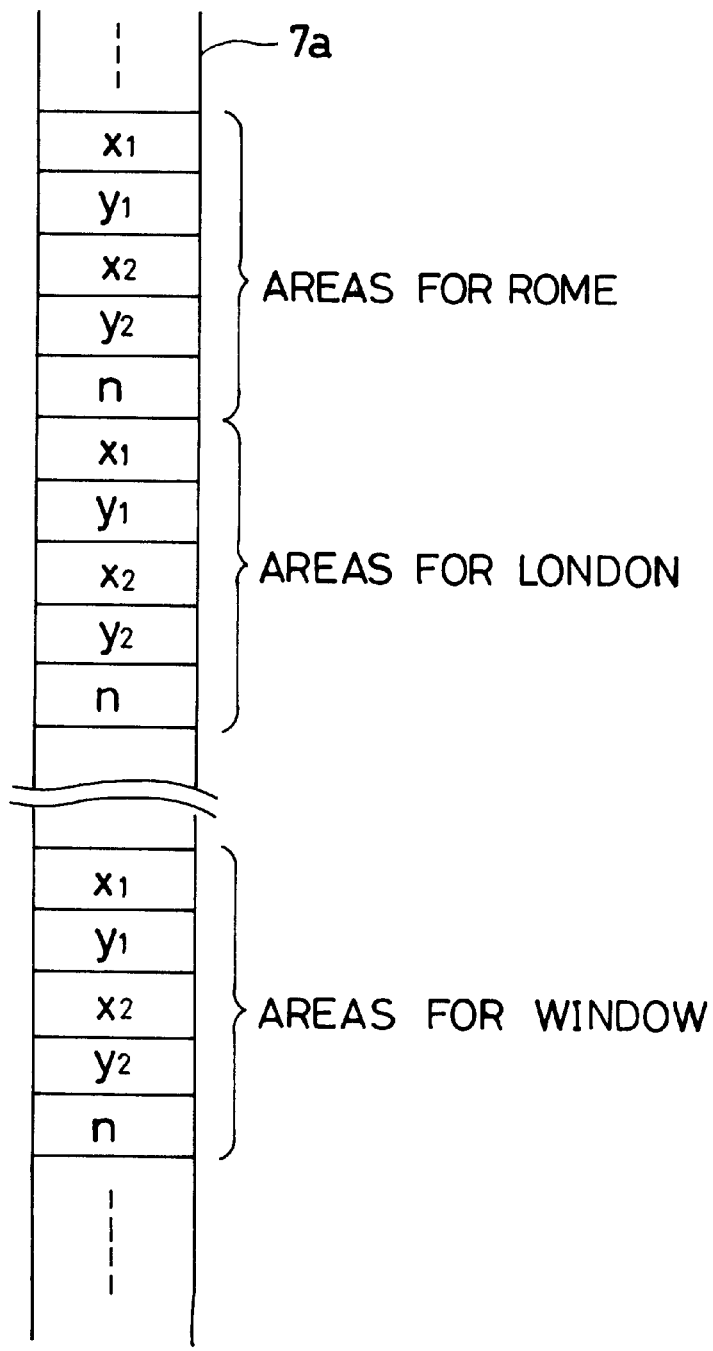

FIG. 3 is a view for explaining a storage format of data in the display buffer 7a. For example, when a list or a map (including a window) is formed on the display screen of the display 2, the display buffer 7a stores position data and area numbers of rectangular areas each having the position of a principal city as the center in units of principal cities to be displayed, which can be discriminated in correspondence with the list, the map, and the window. FIG. 3 exemplifies a case wherein the world map and the window are displayed, and the display buffer 7a stores display data in which start coordinates of each rectangular area are represented by $X_1$ and $Y_1$, end coordinates thereof are represented by $X_2$ and $Y_2$, and an area number in the display screen is represented by n (natural number).

The operation of the first embodiment will be described below.

Figure 4:
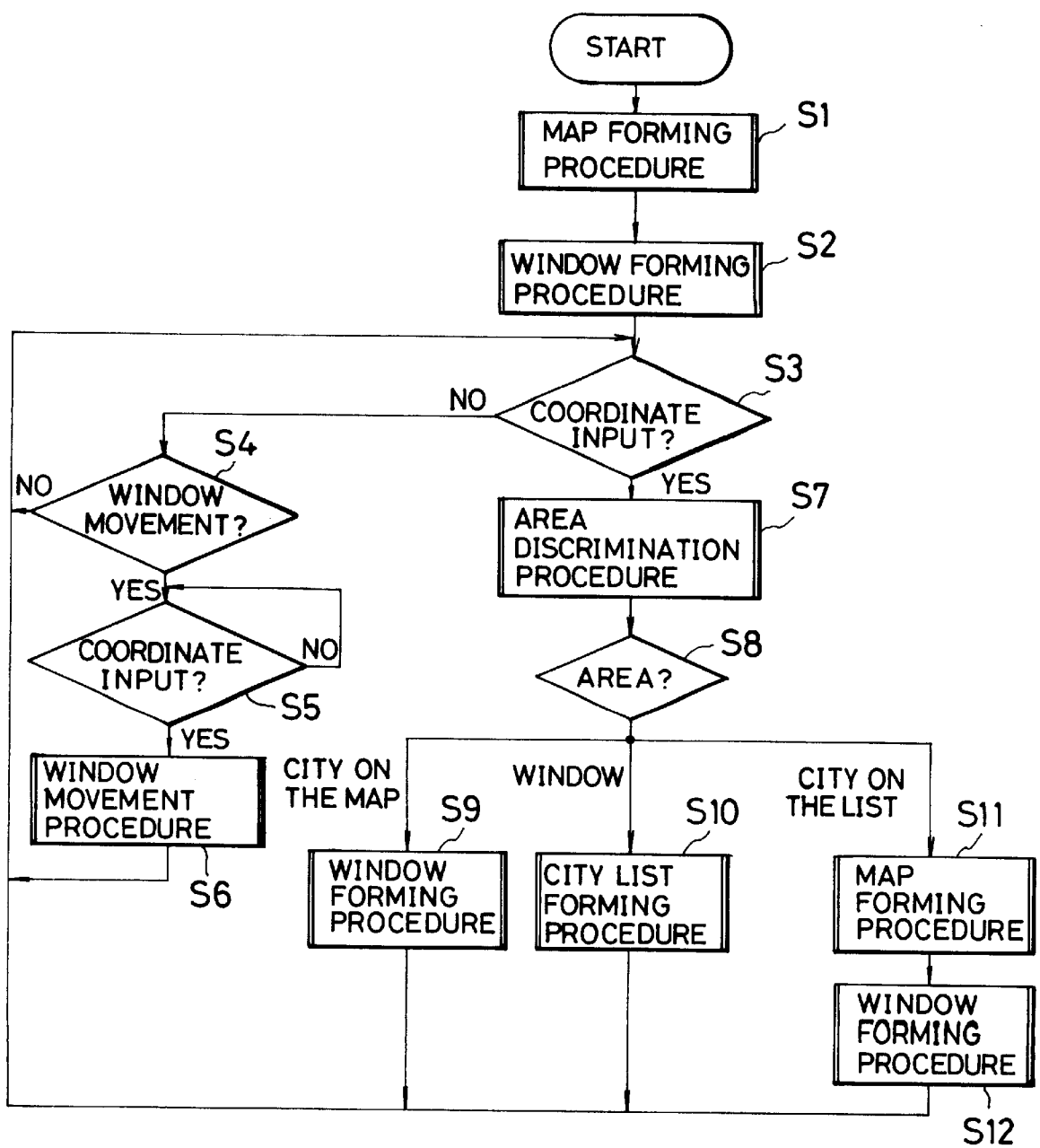
FIG. 4 is a flow chart for explaining an operation of a CPU 5 of the first embodiment.

FIG. 4 is a flow chart for explaining the operation of the CPU 5 of the first embodiment, and FIGS. 5(a), 5(b), 5(c), and 5(d) are views for explaining operating states of the first embodiment. In FIGS. 5(a), 5(b), 5(c), and 5(d), a world map is designated by reference numeral 100, a window is designated by 200, and a list is designated by 300.

Figure 5:
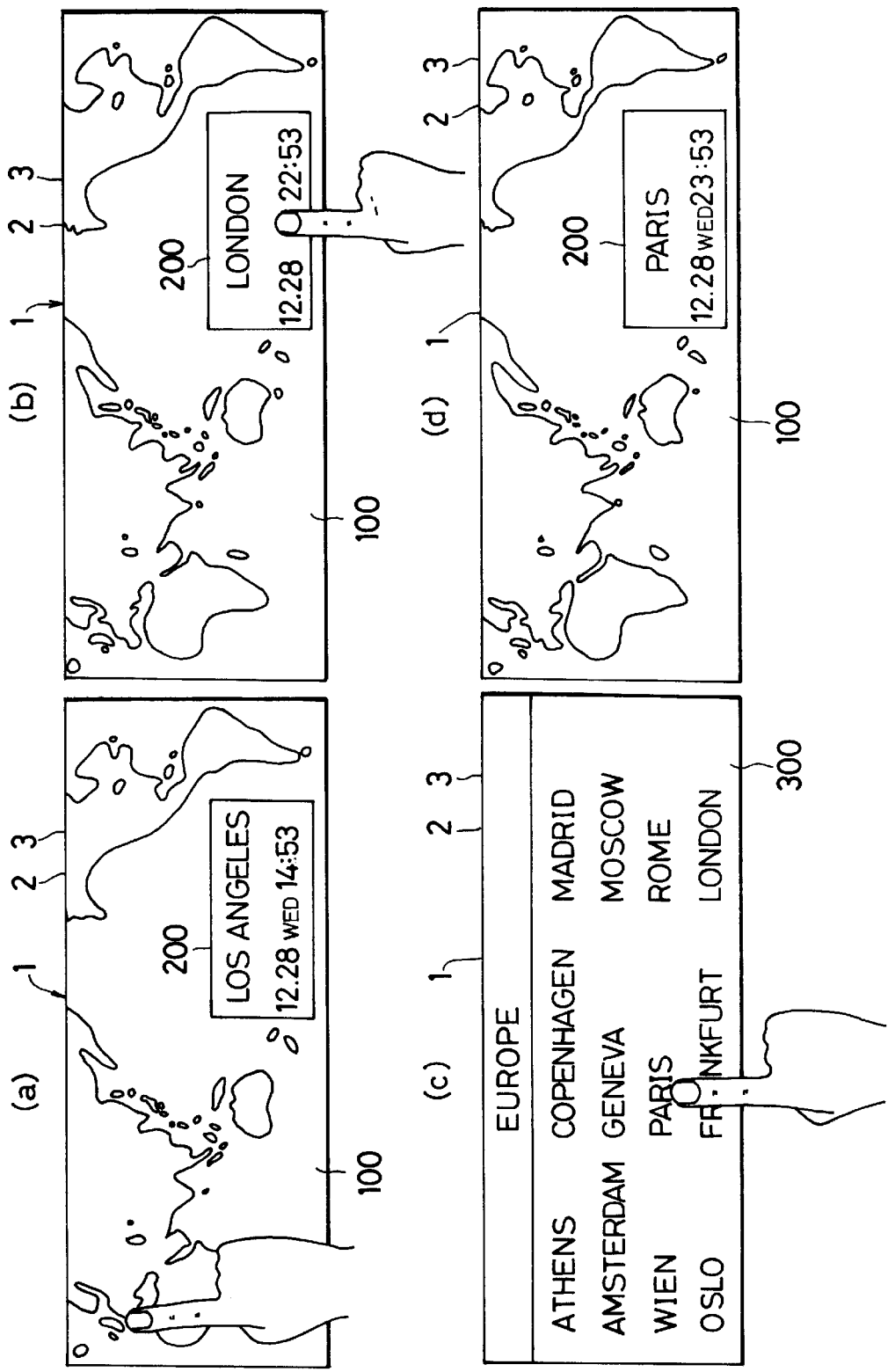
FIGS. 5(a), 5(b), 5(c), and 5(d) are views for explaining operations of the first embodiment.

An operation sequence for obtaining a time in Paris will be exemplified below. After the apparatus of this embodiment is initialized, the world map is displayed on the entire display screen of the display 2. In this case, the display buffer 7a stores positions and area numbers of rectangular areas of principal cities (step S1). Then, the window is formed. In this case, as an initial display, the window 200 which shows a local time in Los Angeles is displayed on a predetermined display area, as shown in FIG. 5(a). Therefore, the window area display data is additionally stored to be able to be discriminated from the display data stored in step S1 (step S2). After an initial frame is formed in this manner, the CPU 5 waits for a coordinate input or an input of the window moving key (step S3 or S4). For example, if an input of the window moving key is detected, the CPU 5 waits for an input of a destination coordinate position (step S5). If the coordinate input indicates a position within the window 200, the CPU 5 does not execute a window movement procedure; otherwise, the CPU 5 calculates a window moving position on the basis of the input coordinate position, and the flow advances to step S3 to wait for the next coordinate input (step S6).

If coordinates (x,y) of an area on the upper left position of the screen are input in step S3, as shown in FIG. 5(a), an area discrimination procedure is started. In this case, the CPU 5 discriminates on the basis of data in units of areas in the display buffer 7a which area defined by the start coordinates $(X_1,Y_1)$ and the end coordinates $(X_2,Y_2)$ includes the input coordinates (x,y). More specifically, if certain coordinate values satisfy $X_1 \leq x \leq X_2$ and $Y_1 < y < Y_2$, it is discriminated that these coordinate values are present within an area which is in comparison. When one area is discriminated in this manner, the area number n serves as data of a city selection procedure. The city selection procedure is executed by using area identification data for identifying whether the discriminated area corresponds to a city area on the map, a window area, or a city name area on the list, as well as the area number n.

If it is identified based on the area identification data that the area number n corresponds to the city area on the map, the flow advances to step S9; if it is identified to be the window area, the flow advances to step S10; and if it is identified to be the city name area on the list, the flow advances to step S11. For example, if the coordinates (x,y) of an upper left area of the screen are input, as shown in FIG. 5(a), it is discriminated that the input area is a city area on the map, and the window 200 displaying a time in Los Angeles at present is updated to that including London as a designated city, as shown in FIG. 5(b). In this case, the city selector 73 selects the designated city on the basis of the area number n and the area identification data of the displayed map. The selected city name is displayed by the window generator 76 within the window 200 together with a time calculation result by the time calculator 77. For example, when the content of the window 200 is updated from Los Angeles to London, if a wrong city is displayed although it is near a designated city, a user can update the content of the window 200 which displays a time in London at present. In this case, the user designates the window 200 to display a list of names of cities near London (including London). After a display of London is made on the window 200, a coordinate input is detected (step S3), and if it is discriminated that the coordinate input designates the area of the window 200 which displays a time in London (steps S7 and S8), the flow advances to step S10 to form a list. As shown in FIG. 5(c), a display procedure of the list 300 of European cities including London is executed (step S10). In this procedure, data of nearby cities corresponding to the city name "London" stored in the list forming table 6b are read out. Thus, the content of the display buffer 7a is rewritten with data based on the list display area division, and the list is displayed on the display 2.

Thereafter, when the user finds a target city name "Paris" from the list 300 and designates the position at the coordinate input device 3, as shown in FIG. 5(c), area discrimination from the input coordinate position is executed, as described above (steps S3, S7, and S8). In this case, the area number n in the area discrimination result is processed as a city name in the list 300 on the basis of the area identification data, and the city name "Paris" is selected from the area-city table 6e. The map is formed in the same manner as in the map forming procedure in step S1 (step S11). Furthermore, a time in Paris as the designated city is calculated, and a display frame in which the window 200 is superimposed on the map 100, as shown in FIG. 5(d), is formed (step S12). With the above operations, principal cities can be selected by one-touch by only designating the positions of cities on the map, and a desired one of cities which cannot be displayed by one-touch can be reliably selected by displaying city names near the principal cities using the list. Since the list presents a plurality of city names near the desired city, the target city can be quickly and accurately searched.

As described above, according to the first embodiment, the data of a target city can be quickly and accurately obtained.

Second Embodiment

The second embodiment will be described below.

The second embodiment exemplifies a data processing apparatus which has a summer time display function in addition to the display functions of the first embodiment. Since the arrangement of the second embodiment is the same as that of the first embodiment except that a summer time display means is added, a description of the overall arrangement will be omitted. The summer time display means serves as a time calculator for causing the window generator to display a time in a city by advancing it in correspondence with the duration of the daytime during a predetermined period of the summer.

The operation of the second embodiment will be described below.

Figure 6:
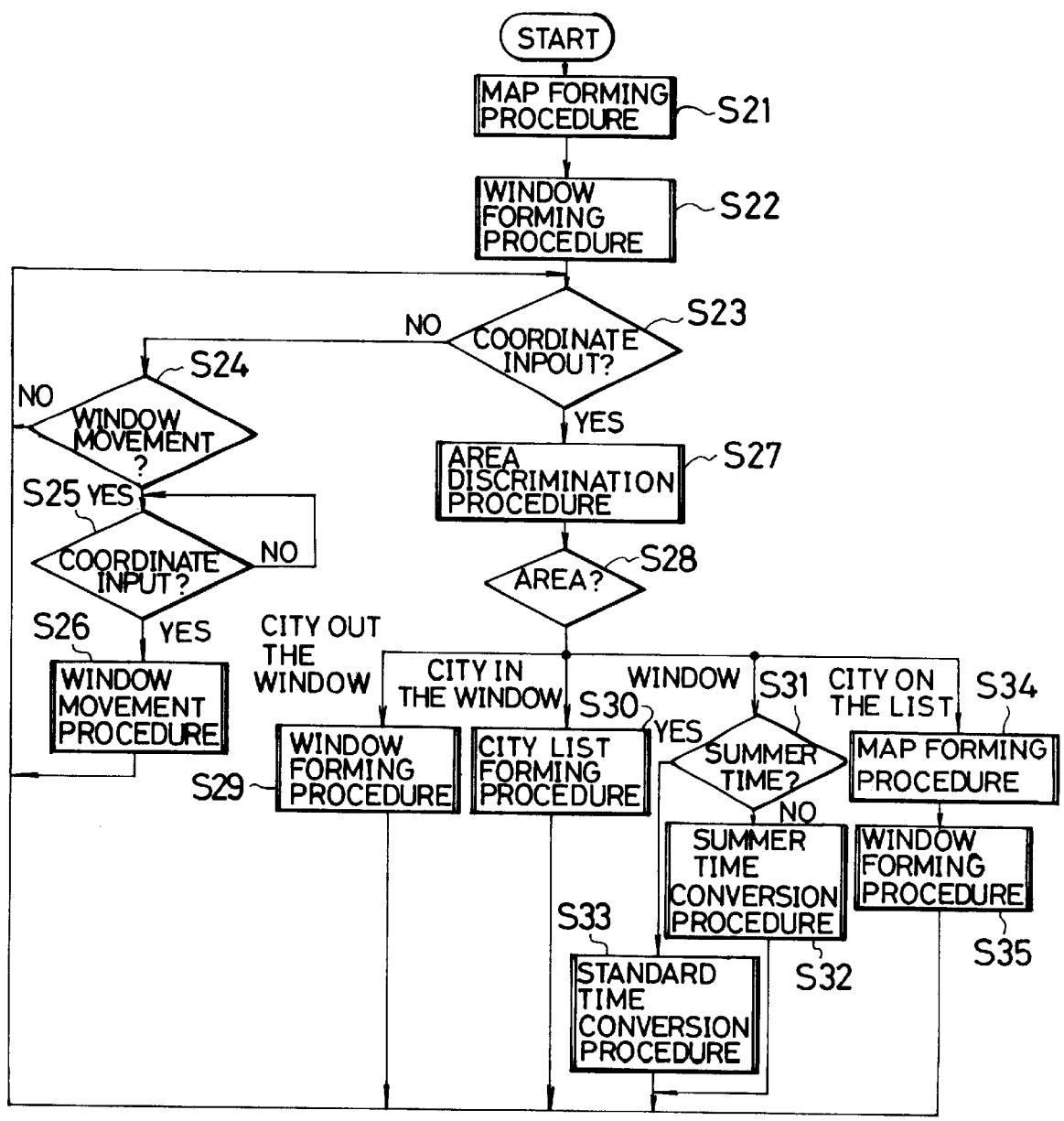
FIG. 6 is a flow chart for explaining an operation of a CPU (not shown) of the second embodiment.

FIG. 6 is a flow chart for explaining the operation of a CPU (not shown) of the second embodiment.

The procedures in steps S21 to S28 are the same as those in steps S1 to S8 in FIG. 3 described in the first embodiment, and a detailed description thereof will be omitted. Note that a display buffer (not shown) stores summer time identification data for identifying whether a time displayed in a window at present is a summer time or standard time. A designated area on the display screen is discriminated in steps S27 and S28, and the following procedures are executed on the basis of the discrimination results. The second embodiment includes four types of display procedures. More specifically, in the first embodiment, even if a city designated on the map is the same city displayed on the window, the display screen is never updated. However, in the second embodiment, if the same city is designated twice on the map, the list of names of cities near the designated city is formed (step S30). When a city name on the list is designated in area discrimination after the coordinate input in step S23, the map and the window of the designated city are formed in the same manner as in the first embodiment (steps S34 and S35). Furthermore, if a window area is designated in area discrimination after the coordinate input in step S23, a summer time and standard time in the city in the designated window are alternately switched on the basis of the summer time identification data (steps S31 to S33). If a city which is not displayed in the window is designated on the map, the window of the designated city is formed in the same manner as in the first embodiment (step S29).

As described above, according to the second embodiment, since a list can be easily displayed by designating the same area on the map twice, a quick display is allowed in a list display mode as well as the same effects as in the first embodiment. A summer time can be displayed, and a variety of needs of users can be satisfactorily met.

In the first and second embodiments, the entire display screen is used when the list is formed. For example, the map and list may be simultaneously displayed. Alternatively, a plurality of windows may be formed so that they can be compared with each other.

In the first and second embodiments, a time in a selected city on the world map is displayed. However, the present invention is not limited to this. For example, the present invention may be applied to a map of a certain city, so that the name of a family of a house selected on the map of the certain city may be displayed. That is, various other changes and modifications may be made within the spirit and scope of the invention.

In the first and second embodiments, movement of the window is allowed so that a time in an area covered by the window is obtained. However, the present invention is not limited to this. If no problem is posed although a time in an area covered by the window cannot be extracted, the window movement procedure function can be omitted. In this case, all the operations can be designated on only the display screen.

What is claimed is:

1. A data processing apparatus comprising:
    memory means for storing a map image and information relating to a plurality of positions on the map image;
    management means for managing for the plurality of positions, a current time and a city name in correspondence with each position;
    display means for displaying the map image stored in said memory means;
    designation means for designating a desired position on the map image displayed by said display means; and
    control means, responsive to a designation by said designation means, for controlling said display means to display, in a movable window formed on the displayed map image, the current time and the city name managed by said management means for the designated position, to replace a current time and a city name previously displayed in the window for a different position responsive to a previous designation, and to display the map image, wherein the window serves as a key operable to instruct said display means to display a list of city names for the designated position.

2. An apparatus according to claim 1, wherein said designation means comprises transparent coordinate input means arranged immediately on said display means.

3. An apparatus according to claim 1, wherein said control means comprises means for enabling said display means to display the time data of the discriminated area on a predetermined area of said display means in a window.

4. An apparatus according to claim 1, wherein the current time for a designated position is derived through a difference in time between the designated position and a reference position.

5. An apparatus according to claim 1, wherein said display means has a partial area for a window for displaying the current time for a designated position.

6. An apparatus according to claim 1, wherein said management means further manages detailed character data corresponding to each of the plurality of positions, and said control means further controls said display means to display the character data instead of the current time.

7. An apparatus according to claim 1, wherein said memory means stores information corresponding to names of the plurality of positions on the map image.

8. A data processing method comprising the steps of:
   storing a map image and information relating to a plurality of positions on the map image in a memory;
   managing for the plurality of positions, a current time and a city name in correspondence with each position;
   displaying the map image stored in said memory on a display;
   designating a desired position on the map image displayed by said display;
   controlling, responsive to the designation in the designating step, the display to display the current time and the city name for the designated position, to replace a current time previously displayed in a window for a different position responsive to a previous designation, and to display the map image;
   displaying a list of city names for the designated position when an input operable through the window is provided.

9. The method according to claim 8, wherein said designating step comprises designating on transparent coordinated input means arranged immediately on said display.

10. The method according to claim 8, wherein said time data displaying step comprises displaying the time data of the discriminated area on a predetermined area of said display in a window.

11. A data processing method according to claim 8, wherein the current time for a designated position is derived through a difference in time between the designated position and a reference position.

12. A data processing method according to claim 8, wherein said display has a partial area for a window for displaying the current time for a designated position.

13. A method according to claim 8, wherein said managing step further includes managing detailed character data corresponding to each of the plurality of positions, and said controlling step further controls the display to display the character data instead of the current time.

14. A method according to claim 8, wherein the storing step further includes storing information corresponding to names of the plurality of positions on the map image.

15. A computer usable medium having stored computer readable instruction codes for a data processing apparatus comprising:
   a first set of computer readable instruction codes for storing a map image and information relating to a plurality of positions on the map image in a memory;
   a second set of computer readable instruction codes for managing for the plurality of positions, a current time and a city name in correspondence with each position;
   a third set of computer readable instruction codes for displaying the map image stored in said memory on a display;
   a fourth set of computer readable instruction codes for designating a desired position on the map image displayed by said display;
   a fifth set of computer readable instruction codes responsive to the designation for controlling the display to display the current time and the city name for the designated position, to replace a current time and a city name previously displayed in a window for a different position responsive to a previous designation, and to display the map image; and
   a sixth set of computer readable instruction codes for instructing the display to display a list of city names for the designated position, wherein the window serves as a key operable to instruct the display to display the list of city names.

16. A computer usuable medium having stored computer readable instruction codes according to claim 15, wherein said second set of computer readable instruction codes for managing for the plurality of positions a current time in correspondence with each position further includes a set of computer readable instruction codes for managing detailed character data corresponding to each of the plurality of positions, and
   said fifth set of computer readable instruction codes includes a set of computer readable instruction codes for controlling the display to display the character data instead of the current time.

17. A computer usablemedium having stored computer readable instruction codes according to claim 15, wherein the first set of computer readable instruction codes for storing a map image and information relating to the plurality of positions on the map image in the memory includes a set of computer readable instruction codes storing information corresponding to names of the plurality of positions on the map image.

* * * * *

UNITED STATES PATENT AND TRADEMARK OFFICE
CERTIFICATE OF CORRECTION

PATENT NO. : 5,909,216
DATED : June 1, 1999
INVENTOR(S) : Kazuhiro Matsubayashi, et al It is certified that error appears in the above-identified patent and that said Letters Patent is hereby corrected as shown below:

COLUMN 1

Line 36, "when" should read --when a--.

COLUMN 8

Line 44, "usablemedium" should read --usable medium--.

Signed and Sealed this

Eighteenth Day of July, 2000

*Attest:*

*Attesting Officer*

Q. TODD DICKINSON
*Director of Patents and Trademarks*